(12) United States Patent
Strizki et al.

(10) Patent No.: US 8,777,538 B2
(45) Date of Patent: Jul. 15, 2014

(54) BONDING FASTENER WITH ENVIRONMENTAL SEALS

(71) Applicant: Renewable Energy Holdings, LLC, Flemington, NJ (US)

(72) Inventors: Michael Strizki, Hopewell, NJ (US); Jason Snyder, Flemington, NJ (US); James Strizki, Hopewell, NJ (US)

(73) Assignee: Renewable Energy Holdings, LLC, Flemington, NJ (US)

( * ) Notice: Subject to any disclaimer, the term of this patent is extended or adjusted under 35 U.S.C. 154(b) by 0 days.

(21) Appl. No.: 13/827,710

(22) Filed: Mar. 14, 2013

(65) Prior Publication Data
US 2014/0072387 A1    Mar. 13, 2014

Related U.S. Application Data

(63) Continuation-in-part of application No. 13/608,540, filed on Sep. 10, 2012.

(51) Int. Cl.
*F16B 43/00* (2006.01)
(52) U.S. Cl.
USPC ........................ 411/371.1; 411/542
(58) Field of Classification Search
CPC ...... F16B 33/004; F16B 35/06; F16B 35/048; F16B 43/001; E04D 3/3606
USPC ........ 411/326, 353, 366.1, 369, 371.1, 371.2, 411/372.6, 500–501, 507, 542, 933, 961, 411/978
See application file for complete search history.

(56) References Cited

U.S. PATENT DOCUMENTS

| | | | |
|---|---|---|---|
| 1,639,637 A | 8/1927 | Hawley |
| 2,236,235 A | 3/1941 | Head |
| 2,795,444 A | 6/1957 | Nenzell |
| 2,895,524 A | 7/1959 | Boyd |
| 2,983,534 A | 5/1961 | Heller et al. |
| 3,040,796 A | 6/1962 | Gouverneur |
| 3,203,459 A | 8/1965 | Coldren |
| 3,265,107 A | 8/1966 | Glicksman |
| 3,389,734 A | 6/1968 | Gutshall |

(Continued)

FOREIGN PATENT DOCUMENTS

GB    2360076 A    12/2001

OTHER PUBLICATIONS

ACME PV Peripherals—WEEB:Washer, Electrical Equipment Bond; promotional sheet from Wiley Electronics, Saugerties, NY; 2009.

*Primary Examiner* — Roberta Delisle
(74) *Attorney, Agent, or Firm* — Brown & Michaels, PC

(57) ABSTRACT

A bonding fastener having two components which electrically bonds metallic surfaces through serrated metal teeth on the underside of the head of the first component and on the inside surface of the second component which embed into each metal surface as a fastener is tightened. In one embodiment, the fastener is a nut and bolt combination, and in another embodiment the fastener is a two-part rivet. A sealing material circumferentially outward from the teeth on both the first component and second component creates an air-tight and water-tight seal around the teeth, protecting the bonding location from air and water infiltration from the outside. The second component also has an internal seal, sealing around the shank of the first component to prevent axial infiltration of air or water along the shank and protecting the bonding locations from corrosion from contaminants entering along that route.

15 Claims, 8 Drawing Sheets

(56) References Cited

U.S. PATENT DOCUMENTS

| | | | |
|---|---|---|---|
| 3,399,589 A | 9/1968 | Breed | |
| 3,520,342 A | 7/1970 | Scheffer | |
| 3,540,509 A * | 11/1970 | Gutshall | 411/145 |
| 3,588,787 A | 6/1971 | Kindell | |
| 3,605,845 A | 9/1971 | Junker | |
| 3,606,357 A | 9/1971 | Yonkers | |
| 3,626,357 A | 12/1971 | Kindell | |
| 3,635,272 A | 1/1972 | Scheffer | |
| 3,825,051 A * | 7/1974 | Sigmund | 411/188 |
| 3,945,704 A * | 3/1976 | Kraus et al. | 439/411 |
| 4,022,262 A | 5/1977 | Gunn | |
| 4,023,882 A | 5/1977 | Pettersson | |
| 4,094,352 A * | 6/1978 | Hlinsky | 411/185 |
| 4,223,711 A | 9/1980 | Tabor | |
| 4,482,278 A | 11/1984 | Dorn | |
| 4,639,175 A * | 1/1987 | Wollar | 411/38 |
| 4,812,095 A * | 3/1989 | Piacenti et al. | 411/188 |
| 4,873,763 A * | 10/1989 | Volonta et al. | 29/825 |
| 5,454,675 A | 10/1995 | DeHaitre | |
| 5,957,641 A | 9/1999 | Bogatz et al. | |
| 6,231,286 B1 | 5/2001 | Bogatz et al. | |
| 6,244,807 B1 * | 6/2001 | Garcia | 411/369 |
| 6,347,708 B1 * | 2/2002 | Ostergaard | 209/326 |
| 6,817,817 B2 | 11/2004 | Dembowsky et al. | |
| 7,014,406 B2 * | 3/2006 | Robertson | 411/161 |
| 7,354,075 B2 * | 4/2008 | Hagen | 285/143.1 |
| 7,597,516 B2 | 10/2009 | Bucciferro et al. | |
| 7,645,105 B2 * | 1/2010 | Hengel et al. | 411/171 |
| 8,070,404 B1 | 12/2011 | Schluter | |
| 8,092,129 B2 | 1/2012 | Wiley et al. | |

* cited by examiner

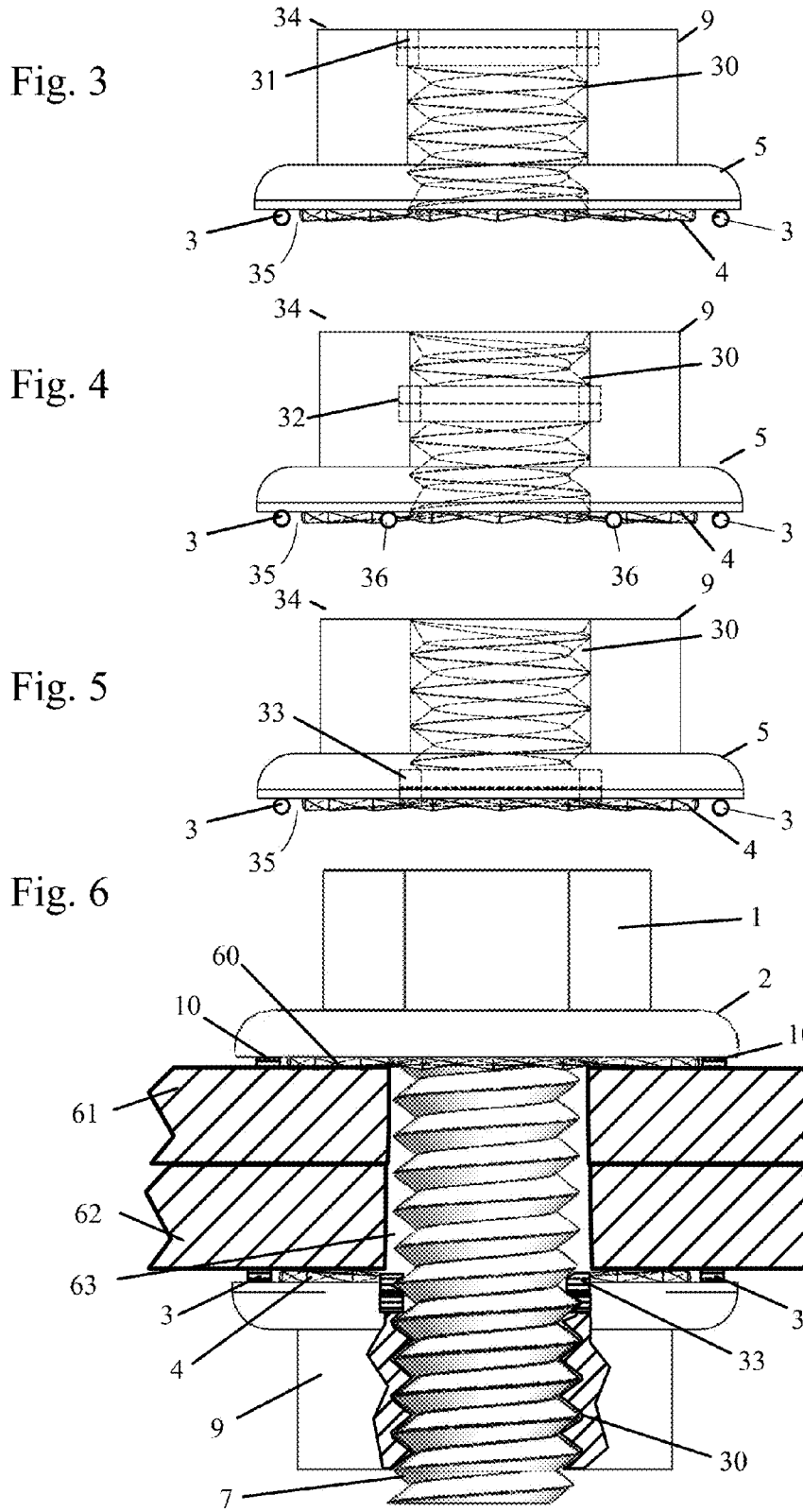

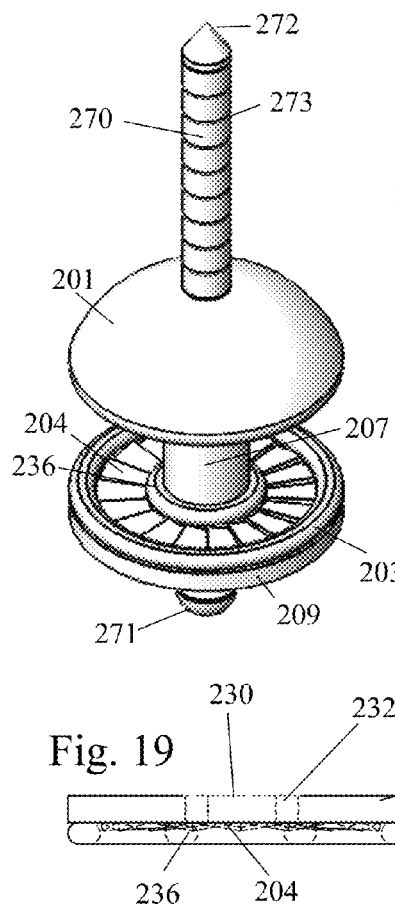
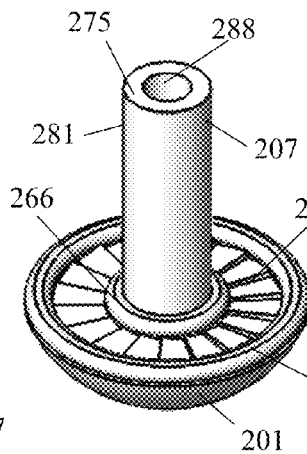
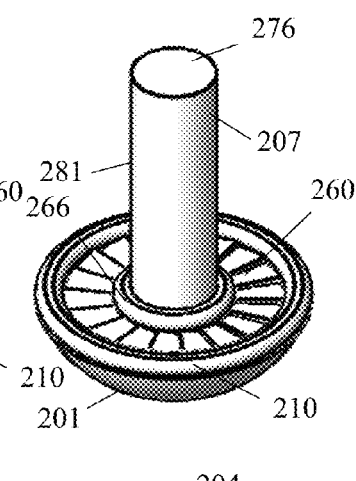
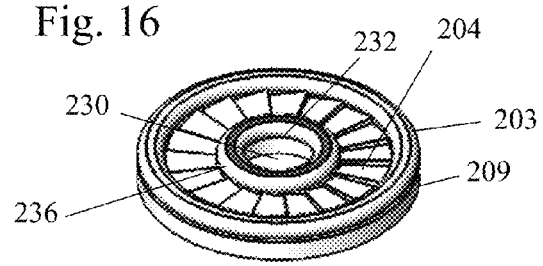
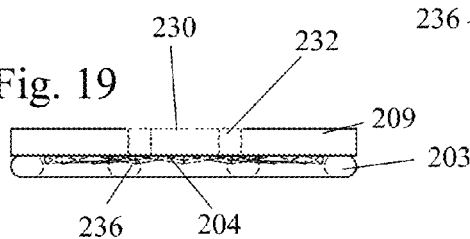
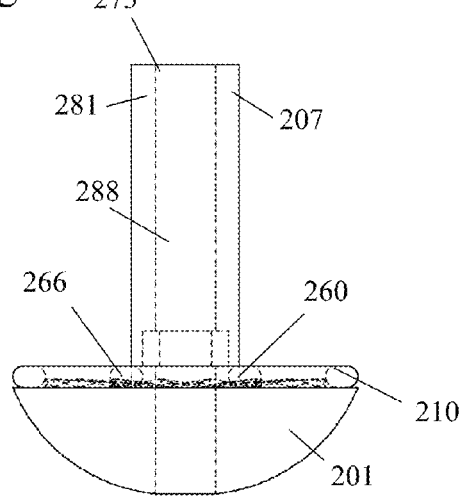
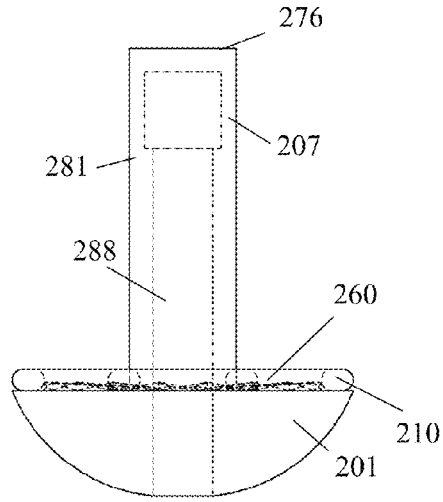

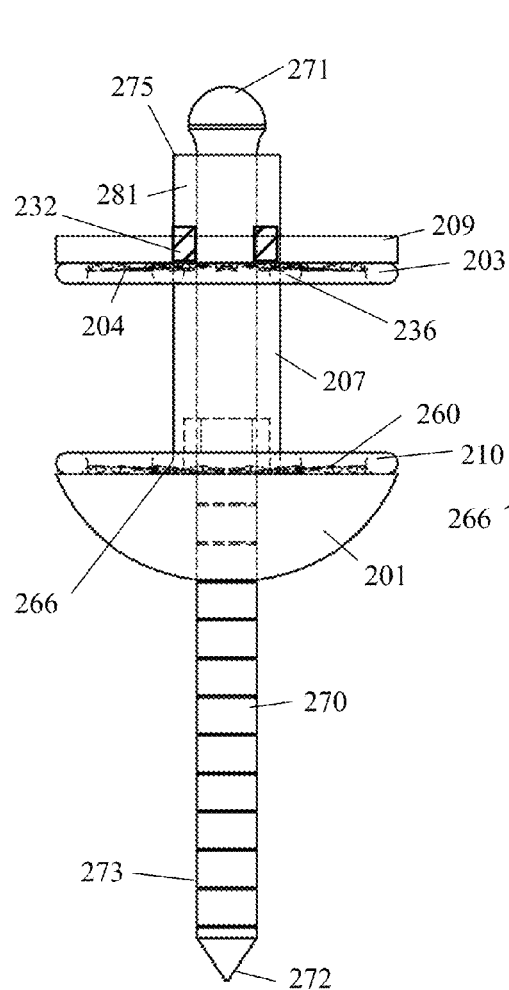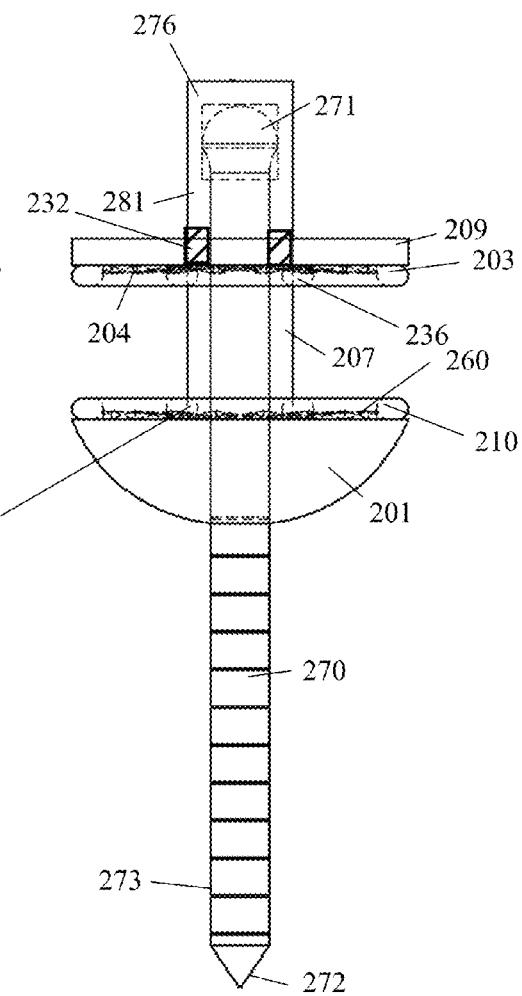

BONDING FASTENER WITH ENVIRONMENTAL SEALS

REFERENCE TO RELATED APPLICATIONS

This is a continuation-in-part of co-pending parent patent application Ser. No. 13/608,540, entitled "Air-Tight and Water-Tight Electrical Bonding Device", filed Sep. 10, 2012. The aforementioned application is hereby incorporated herein by reference.

BACKGROUND OF THE INVENTION

1. Field of the Invention

The invention pertains to the field of electrical bonding devices. More particularly, the invention pertains to electrical bonding fasteners having seals against corrosion induced by air and water.

2. Description of Related Art

Bonding devices are commonly used for bonding electrical assemblies, such as frames for solar panel supports or the like. These are often in the form of external tooth lock washers, which have a flat central section and twisted teeth around the perimeter of the washer. The device is placed between the frames, and a fastener such as a bolt or screw passes through the frames and the center of the washer. When the fastener is tightened, the twisted teeth bite into the facing surfaces of the frames to penetrate any surface corrosion or coating and create a good electrical connection.

A problem with the prior art is that air and water are free to pass around the teeth of the washer. Over time the washer, or the surfaces of the frames into which the teeth are biting, can corrode by exposure to air and water. This allows the electrical connection between the frames to degrade.

Wiley Electronics of Saugerties, N.Y., sells a line of bonding devices called WEEB (Washer, Electrical Equipment Bonding) connectors, which are used in assembling and grounding outdoor electrical equipment such as photovoltaic solar panel arrays and the like. The metal teeth of the WEEB clip deform during installation to provide the bonding and some degree of self-sealing, so it is a single-use item and cannot be reused.

U.S. Pat. No. 2,895,524, entitled "Twisted tooth lock washer having anti-skid body section", is a toothed washer having a resilient o-ring around its inner diameter which is intended to keep the washer from rotating as the bolt is tightened. To the extent that the o-ring provides a seal, it is only on one side and only around the bolt. Water and air are free to infiltrate around the outside of the teeth.

U.S. Pat. Nos. 3,588,787 and 3,626,357, entitled "Electrical Connecting Washer" show a flat washer with o-rings on one side. A circular row of teeth is provided on one side of the washer, roughly midway between the central screw hole and the outer perimeter of the washer, and two o-rings radially inward and outward from the teeth provide a seal, but on one side only. This design does not bond two items, rather is intended to enhance the bond between a screw and the wall to which it is screwed. A wire could be trapped under the screw head, but the electrical connection between wire and screw, or screw and washer, remains open to corrosion.

British published application GB2360076, entitled "A fastener having cutting surfaces and seals" has teeth on the underside of the bolt head, with both inner and outer seals radially inward and outward from the teeth. Similarly, U.S. Pat. No. 3,389,734, entitled "Locking and sealing Screw" patent is a bolt with teeth on the underside of the bolt head and seal area formed from the bolt material radially outside of the teeth. Both of these publications are designed to screw into a threaded hole or fitting on a surface, not to interface with a nut. There is no concern about leakage along the threads, since the inside of a car is dry, and the bolt is not grounding there.

U.S. Pat. No. 6,244,807, entitled "Double seal nut", is a nut with an outer O-ring to prevent radial leakage between the nut and the surface against which it is tightened and a Teflon inner thread seal to prevent leakage axially along the threads. The nut has no teeth for electrical conduction.

SUMMARY OF THE INVENTION

The bonding fastener of the invention is a combination of two components which electrically bonds metallic surfaces through serrated metal teeth on the underside of the head of the first component and on the inside surface of the second component which embed into each metal surface as a fastener is tightened. In one embodiment, the fastener is a nut and bolt combination, and in another embodiment the fastener is a two-part rivet. A sealing material circumferentially outward from the teeth on both the first component and second component creates an air-tight and water-tight seal around the teeth, protecting the bonding location from air and water infiltration from the outside. The second component also has an internal seal, sealing around the shank of the first component to prevent axial infiltration of air or water along the shank and protecting the bonding locations from corrosion from contaminants entering along that route.

BRIEF DESCRIPTION OF THE DRAWING

FIG. 3 shows an embodiment of the second component of the fastener in a nut embodiment, with the thread seal on the outside face of the threads.

FIG. 4 shows an alternate embodiment of the second component of the fastener, with the thread seal along the threads of the nut, and also with an inner O-ring seal.

FIG. 5 shows an alternate embodiment of the second component of the fastener, with the thread seal on the inside face of the nut.

FIG. 6 shows a cut-through drawing of the fastener of the invention in use.

FIG. 15 shows a perspective view of the fastener of the invention, in an embodiment as a blind rivet and retaining ring.

FIG. 16 shows a perspective view of the retaining ring of the embodiment of FIG. 15.

FIG. 17 shows a perspective view of an open-end version of the blind rivet of the embodiment of FIG. 15, shown inverted from FIG. 15 and without the mandrel.

FIG. 18 shows a perspective view of a closed-end version of the blind rivet of the embodiment of FIG. 15, shown inverted from FIG. 15 and without the mandrel.

FIG. 19 shows a cut-through drawing of the retaining ring of the embodiment of FIG. 15.

FIG. 20 shows a cut-through drawing of the blind rivet of the embodiment of FIG. 17.

FIG. 21 shows a cut-through drawing of the blind rivet of the embodiment of FIG. 18.

FIG. 22 shows a cut-through drawing of the fastener, using the open-end blind rivet of FIG. 17.

FIG. 23 shows a cut-through drawing of the fastener, using the closed-end blind rivet of FIG. 18.

DETAILED DESCRIPTION OF THE INVENTION

Figure 1:
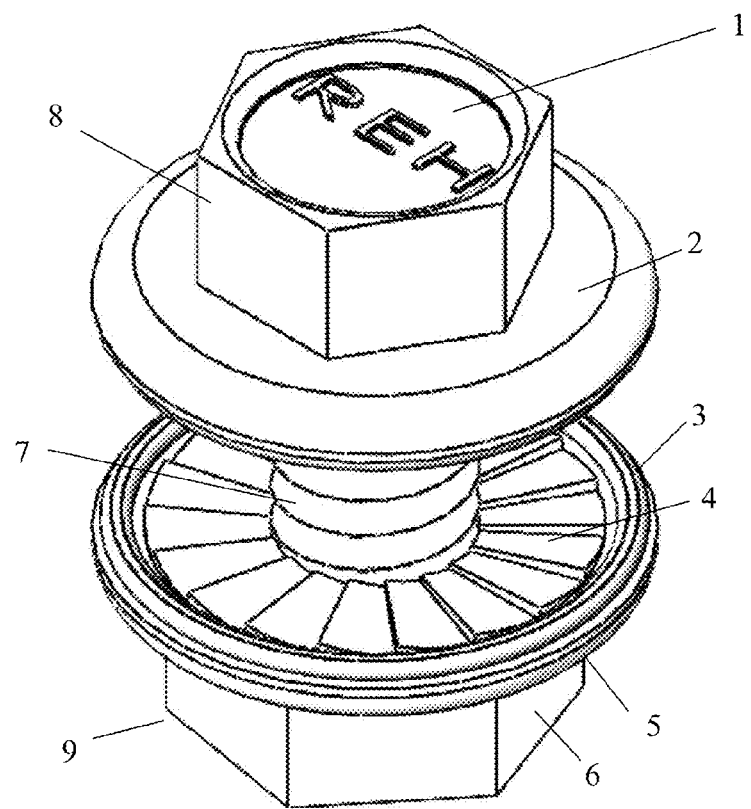
FIG. 1 shows a perspective view of the fastener of the invention, in a nut-and-bolt embodiment.
Figure 2:
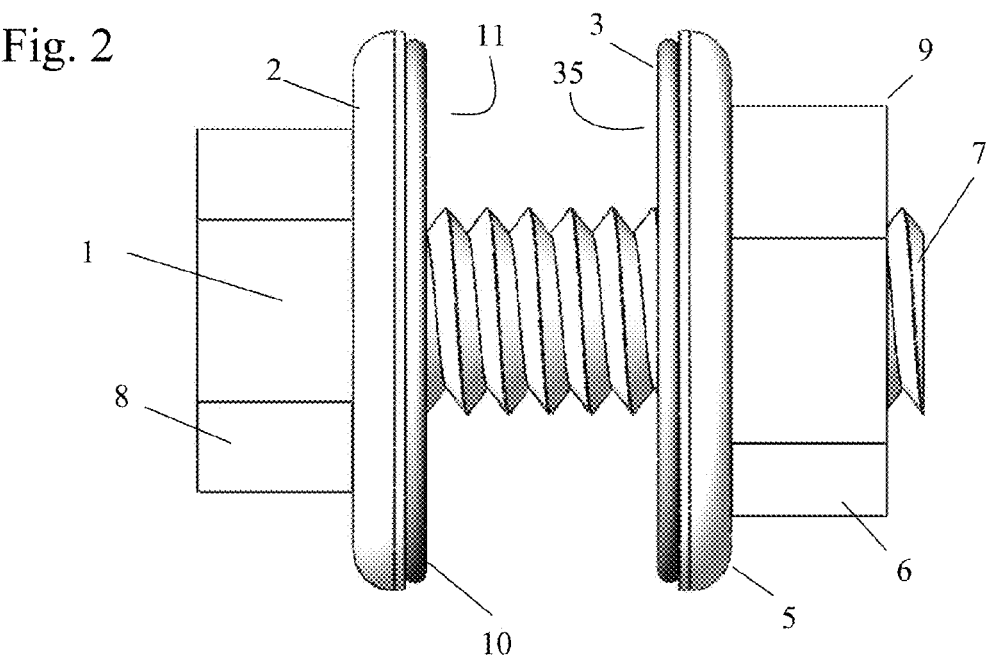
FIG. 2 shows a side view of the fastener of the embodiment of FIG. 1.

The bonding fastener of the invention is a combination of two components which electrically bonds metallic surfaces through serrated metal teeth on the underside of the head of the first component and on the inside surface of the second component which embed into each metal surface as a fastener is tightened. In one embodiment, the fastener is a nut and bolt combination, and in another embodiment the fastener is a two-part rivet.

FIGS. 1 to 6 show the nut-and-bolt embodiment of the bonding fastener. In this embodiment, the first component is a bolt 1 with a head 8 having a conventional design for turning by a wrench, an optional flange 2 and a threaded shank 7.

The second component is a mating nut 9 which similarly has a portion 6 for turning by a wrench, an optional flange 5, and a central bore 30 which is threaded to mate with the threaded shank 7 of the bolt 1.

The facing lower surface 11 of the head 8 or optional flange 2 on bolt 1 and upper surface 35 of flange 5 on nut 9 are formed with serrated bonding teeth 60 and 4, respectively. Teeth 60 protrude axially outward from the lower surface 11 of flange 2 on bolt 1, and teeth 4 protrude axially outward from the upper surface 35 of flange 5 on nut 9. It will be understood that the terms "lower surface of flange 2" and "upper surface 35 of flange 5" are not meant to convey any particular vertical or horizontal orientation, but rather are intended to mean the surface of the flange on the bolt or nut which will contact the surfaces of the parts which the bonding fastener is to bond.

The teeth 4 can be any shape or pattern of shapes which will pierce and or cut the surface of the adjacent material, for example the bent or serrated teeth shown in the figures, or cones, points, squares, a cut or punched pattern into the surface of the flange, or other designs known to the art.

The bolt 1 and nut 9 can be made of any rigid metal or other conductive material, as is known for use in prior art fasteners. The particular metal used can depend on the nature of the metal surfaces to be bonded—it will be understood by one known to the art that it can be desirable to avoid contact between certain dissimilar metals due to the possibility of galvanic corrosion or RF noise effects. The metal can be coated or plated with a conductive coating or metal layer.

Outer seal 10 is located on the lower surface 11 of flange 2 on bolt 1, radially outside of the teeth 60. Similarly, outer seal 3 is located on the upper surface 35 of flange 5 on nut 9, radially outside of the teeth 4. Seals 10 and 3 limit infiltration of air, water or other environmental contaminants radially inward from the environment into the bonding teeth. The outer seals 10 and 3 are made of resilient sealing material, such as synthetic or natural rubber, silicone, neoprene or other material known to the art which can withstand outdoor exposure and compressive forces. Since the seals are resilient and the bolt and nut of the fastener do not deform during use, the fastener should be able to be re-used multiple times without losing its ability to seal against environmental contamination.

The nut 9 has an inner seal to limit infiltration of air, water or other environmental contaminants axially between the threads 7 of the bolt 1 and the threads of the threaded central bore 30 of the nut. This prevents these contaminants from entering from the environment into interior of the bond and corroding the bonding teeth.

Figure 9:
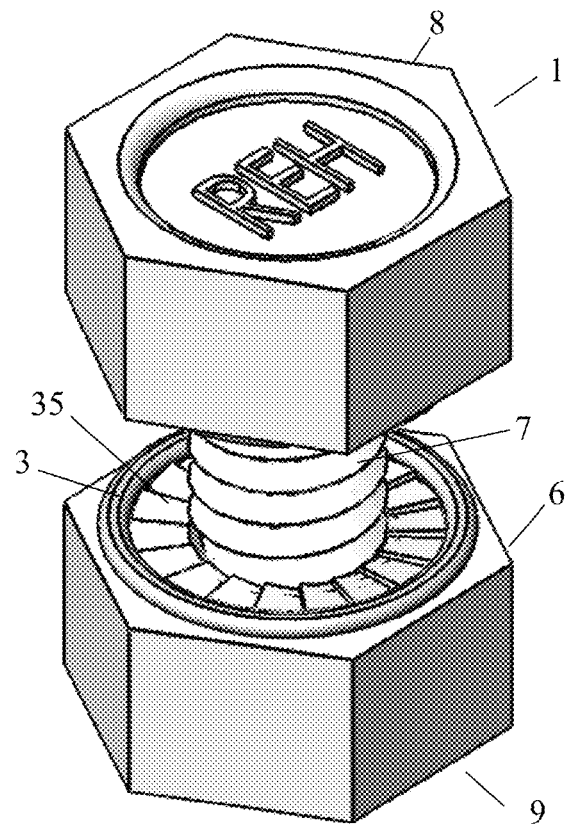
FIG. 9 shows a perspective view of a variation on the embodiment of FIG. 1, in which the fastener lacks flanges on the bolt head and nut.
Figure 10:
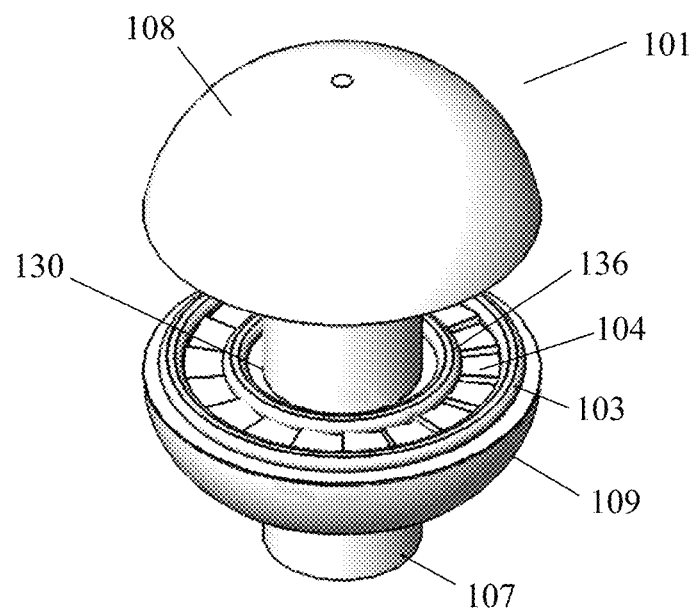
FIG. 10 shows a perspective view of the fastener of the invention, in an embodiment as a rivet and retaining ring.

FIG. 9 shows an alternative version of the nut-and-bolt embodiment, in which there are no optional flanges, and the head 8 of the bolt 1 and body 6 of the nut 9 have the teeth 60 and 4 and outer seals 10 and 3, respectively.

FIGS. 3-5 show three different locations for the inner seal. As shown in FIG. 3, the seal 31 can be adjacent to the lower surface 34 of the nut 9, closest to the outside, such that contaminants cannot penetrate into the threaded area 30 at all. FIG. 4 shows an alternative embodiment in which the seal 32 is inside the nut 9, in this example midway between the upper surface 35 and lower surface 34 of the nut 9. FIG. 5 shows another alternative embodiment in which the seal 33 is at the upper surface 35 of the nut 9. It will be understood that in the embodiments of FIGS. 4 and 5, contaminants may be able to penetrate at least some distance along the threaded area 30, but will still be stopped by seal 32 or 33 before entering the inside of the bonded area.

FIG. 4 also shows an additional inner seal 36, located radially inward of the teeth 4 on the nut 9. This optional seal, which can be an O-ring as shown, provides additional protection for the teeth 4 from water or other environmental contaminants from the inside of the nut.

FIG. 6 shows the fastener in use fastening two frames 61 and 62 which are to be electrically bonded. The bolt 1 is passed through hole 63 in frames 61 and 62, and nut 9 is threaded onto the bolt 1.

As the fastener is tightened by rotating bolt 1 or nut 9, or both, teeth 60 of the bolt 1 and teeth 4 of the nut 9 embed into the outer surfaces of frames 61 and 62 at a bonding location around the fastener, creating an electrical bond from frame 61 to frame 62 through the fastener. At the same time, the outer seal 10 on flange 2 of bolt 1 is compressed to create an air-tight and water-tight seal between the outer surface of the frame 61 and the lower surface 11 of flange 2, radially outside of the teeth 60. Similarly, the outer seal 3 on flange 5 of nut 9 is compressed to create an air-tight and water-tight seal between the outer surface of the frame 62 and the upper surface 35 of flange 5, radially outside of the teeth 4. Inner seals 33 on nut 9 conform to and seal the threads of the threaded portion 7 of the bolt 1, creating an air-tight and water-tight seal along the interface between the bolt 1 threads 7 and the threaded portion 30 of nut 9.

These air-tight and water-tight seals radially outward from the teeth on both the upper surface and lower surface of the fastener, and the inner seals along the threads protect the bonding location from corrosion or other deterioration induced by air or water or other fluids which might surround the bond.

Figure 7:
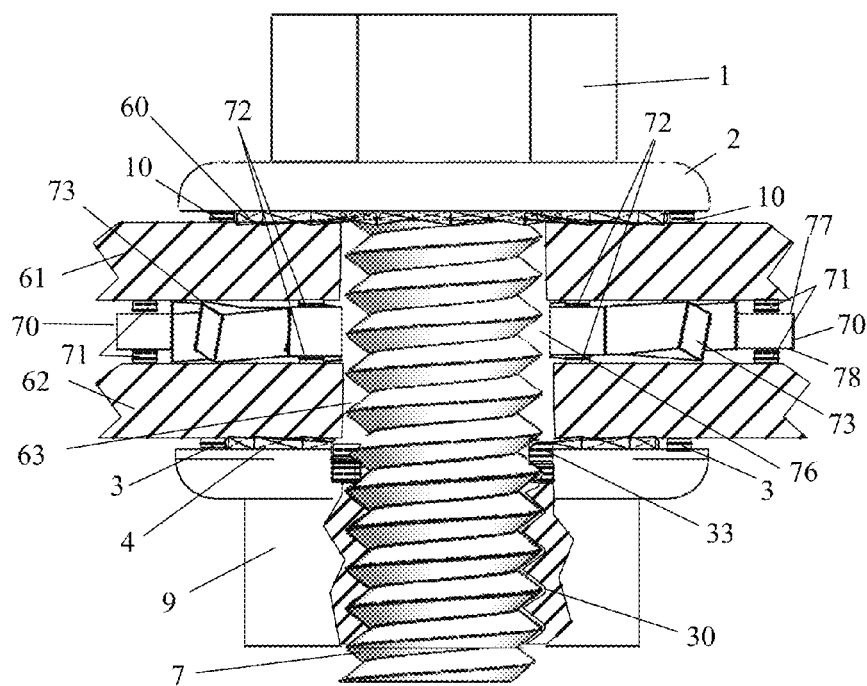
FIG. 7 shows a cut-through drawing of the fastener of the invention in use, combined with the air- and water-tight electrical bonding washer of the parent application.

FIG. 7 shows the fastener in use in combination with the "Air-Tight and Water-Tight Electrical Bonding Device" disclosed and claimed in the parent application to this continuation-in-part, Ser. No. 13/608,540, which is incorporated herein by reference.

Figure 8:
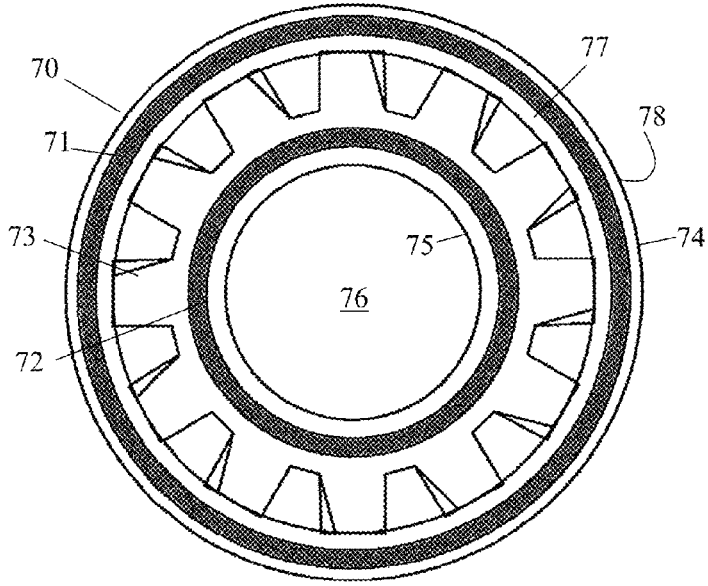
FIG. 8 shows the air- and water-tight electrical bonding washer of the parent application.

FIG. 8 shows one embodiment of the bonding device from the parent application. As can be seen in this figure, the bonding device has a generally circular metallic body 70 with an outer perimeter 74 and an inner perimeter 75 surrounding a central hole 76 through which a fastener may pass. A plurality of serrated metal teeth 73 are provided between the inner perimeter 75 and outer perimeter 74. These teeth 73 protrude axially outward from the upper surface 77 and lower surface 78 of the body 70.

The teeth 73 can be any shape or pattern of shapes which will pierce and or cut the surface of the adjacent material, for example the bent or serrated teeth shown in the figures, or cones, points, squares, a cut or punched pattern into the surface of the body 70, or other designs known to the art.

The metallic body 70 can be made of any rigid metal or other conductive material, as is known for use in prior art toothed washers. The particular metal used can depend on the nature of the metal surfaces to be bonded—it will be understood by one known to the art that it can be desirable to avoid contact between certain dissimilar metals due to the possibility of galvanic corrosion or RF noise effects. The metal can be coated or plated with a conductive coating or metal layer.

Outer seals 71 are located on the upper surface 77 and lower surface 78 of the device, circumferentially between the outer perimeter 74 and the teeth 73. Also, inner seals 72 are located on the upper surface 77 and lower surface 78, circumferentially between the inner perimeter 75 and the teeth 73. The inner seals 72 and outer seals 71 are preferably made of resilient sealing material, such as synthetic or natural rubber, silicone, neoprene or other material known to the art which can withstand outdoor exposure and compressive forces.

These air-tight and water-tight seals 71 and 72 both radially inward and radially outward from the teeth 73 and on both the upper surface 77 and lower surface 78 of the device protect the bonding location from corrosion or other deterioration induced by air or water or other fluids which might surround the bond.

As can be seen in FIG. 7, the bonding device can be used in combination with the fastener, where it is desirable to provide a better electrical bond between two frames 61 and 62. The bonding device is placed between the frames 61 and 62, with the central hole 76 aligned with hole 63 in the frames 61 and 62. The bolt 1 is passed through hole 63 and central hole 76, and nut 9 is threaded onto the bolt 1.

As the fastener is tightened by rotating bolt 1 or nut 9, or both, teeth 60 of the bolt 1 and teeth 72 of the bonding device, teeth 4 of the nut 9 embed into the outer surfaces of frames 61 and 62 at a bonding location around the fastener, creating an electrical bond from frame 61 to frame 62 through the fastener. Being compressed between the frames 61 and 62, the teeth 72 of the body 70 of the bonding device embed into the inner surfaces of frames 61 and 62 at a bonding location around the device, creating a further electrical bond from frame 61 to frame 62 through the device.

At the same time, the outer seal 10 on flange 2 of bolt 1 is compressed to create an air-tight and water-tight seal between the outer surface of the frame 61 and the lower surface 11 of flange 2, radially outside of the teeth 60. Similarly, the outer seal 3 on flange 5 of nut 9 is compressed to create an air-tight and water-tight seal between the outer surface of the frame 62 and the upper surface 35 of flange 5, radially outside of the teeth 4. Inner seals 33 on nut 9 conform to and seal the threads of the threaded portion 7 of the bolt 1, creating an air-tight and water-tight seal along the interface between the bolt 1 threads 7 and the threaded portion 30 of nut 9. These air-tight and water-tight seals radially outward from the teeth on both the upper surface and lower surface of the fastener, and the inner seals along the threads protect the bonding location from corrosion or other deterioration induced by air or water or other fluids which might surround the bond.

Also, the inner seal 72 and outer seal 71 on the upper surface 77 and lower surface 78 of the body 70 of the device are compressed to create an air-tight and water-tight seal around the teeth 73 between the upper surface 77 of the body 70 and the lower surface upper frame 61 and between the lower surface 78 of the body 70 and the upper surface of lower frame 62. These air-tight and water-tight seals both radially inward and radially outward from the teeth and on both the upper surface and lower surface of the device protect the bonding location from corrosion or other deterioration induced by air or water or other fluids which might surround the bond.

FIGS. 10 to 14 show the the bonding fastener in a two-piece rivet embodiment. In this embodiment, the first component is a rivet 101 with a head 108 and a shank 107. The second component is a mating retaining ring 109 which has a central bore 130 which is sized to press-fit upon shank 107 of the rivet 101.

The facing lower surface 111 of the head 108 of rivet 101 and upper surface 135 of retaining ring 109 are formed with serrated bonding teeth 160 and 104, respectively. Teeth 160 protrude axially outward from the lower surface 111 of rivet 101, and teeth 104 protrude axially outward from the upper surface 135 of retaining ring 109. It will be understood that the terms "lower surface" and "upper surface" are not meant to convey any particular vertical or horizontal orientation, but rather are intended to mean the surface of the head of the rivet 101 or retaining ring 109 which will contact the surfaces of the parts which the bonding fastener is to bond.

The teeth 104 and 160 can be any shape or pattern of shapes which will pierce and or cut the surface of the adjacent material, for example the bent or serrated teeth shown in the figures, or cones, points, squares, a cut or punched pattern into the surface of the flange, or other designs known to the art.

The rivet 101 and retaining ring 109 can be made of any rigid metal or other conductive material, as is known for use in prior art fasteners. The particular metal used can depend on the nature of the metal surfaces to be bonded—it will be understood by one known to the art that it can be desirable to avoid contact between certain dissimilar metals due to the possibility of galvanic corrosion or RF noise effects. The metal can be coated or plated with a conductive coating or metal layer.

Outer seal 110 is located on the lower surface 111 of rivet 101, radially outside of the teeth 160. Similarly, outer seal 103 is located on the upper surface 135 of retaining ring 109, radially outside of the teeth 104. Seals 110 and 103 limit infiltration of air, water or other environmental contaminants radially inward from the environment into the bonding teeth. The outer seals 110 and 103 are made of resilient sealing material, such as synthetic or natural rubber, silicone, neoprene or other material known to the art which can withstand outdoor exposure and compressive forces.

Figure 14:
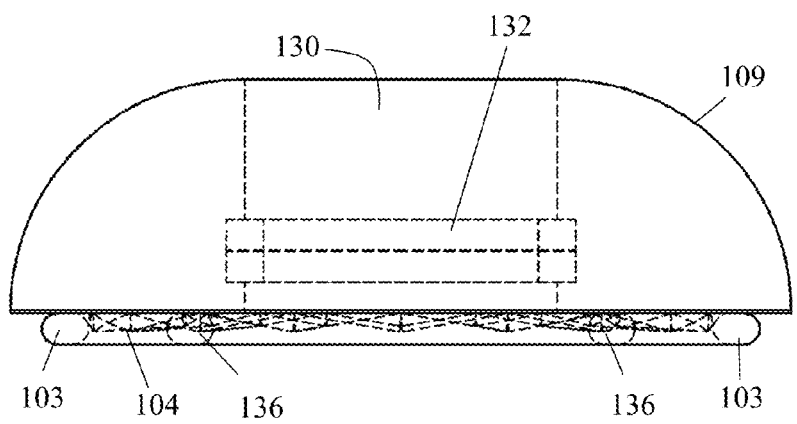
FIG. 14 shows a cut-through drawing of the retaining ring of the embodiment of FIG. 10.

The retaining ring 109 has inner seal 132 to limit infiltration of air, water or other environmental contaminants axially between the shank 107 of the rivet 101 and the central bore 130 of the retaining ring 109. This prevents these contaminants from entering from the environment into interior of the bond and corroding the bonding teeth. As shown in FIGS. 3-5 in the first embodiment, the inner seal 132 could be located centrally, as shown in FIG. 14, or adjacent the upper or lower surfaces of the retaining ring 109.

Figure 11:
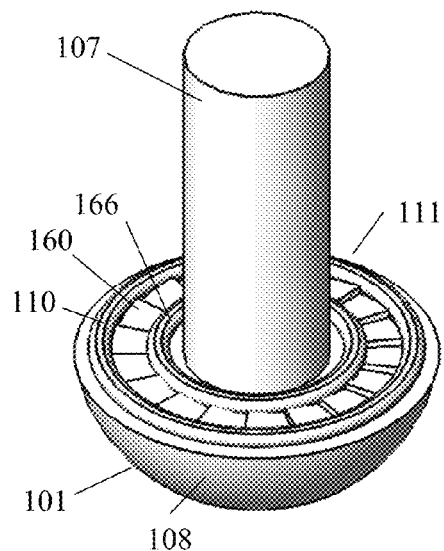
FIG. 11 shows a perspective view of the rivet of the embodiment of FIG. 10, shown inverted from FIG. 10.
Figure 12:
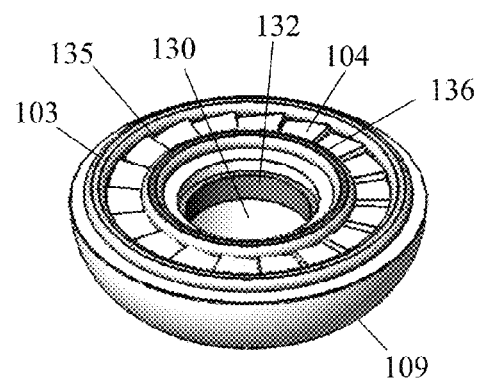
FIG. 12 shows a perspective view of the retaining ring of the embodiment of FIG. 10.
Figure 13:
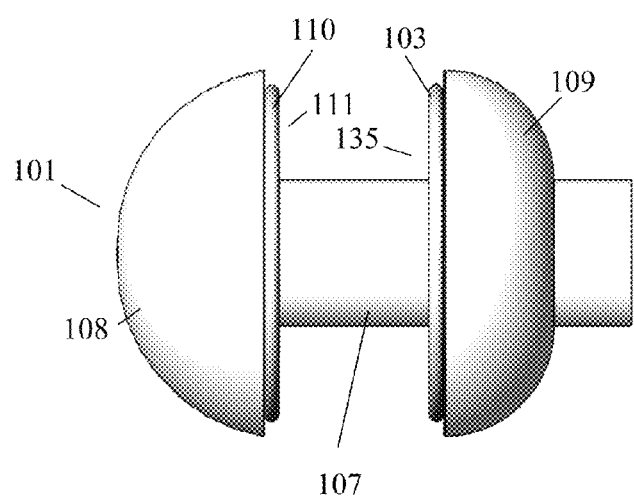
FIG. 13 shows a side view of the fastener in the embodiment of FIG. 10.

As shown in FIGS. 11 and 12, the rivet 101 and retaining ring 109 can also have additional inner seals 166 and 136, located radially inward of the teeth 160 and 104, respectively. This optional seal, which can be an O-ring as shown, provides additional protection for the teeth 106 and 104 from water or other environmental contaminants from the inside of the bond.

In this embodiment, the fastener is tightened by pressing the retaining ring 109 on the shank 107 of the rivet 101, as is known in prior art two-part rivets. In the same way as explained with respect to the nut-and-bolt embodiment of FIGS. 1-9, above, a fastener is tightened, the teeth 160 of the rivet 101 and the teeth 104 of the retaining ring 109 embed into the outer surfaces of the bonding location around the fastener, creating an electrical bond through the fastener. At the same time, the outer seal 110 of rivet 101 is compressed to create an air-tight and water-tight seal radially outside of the teeth 160 and outer seal 103 of retaining ring 109 is compressed to create an air-tight and water-tight seal radially outside of the teeth 104. Inner seal 132 on retaining ring 109 conforms to and seals the shank of the rivet 101, creating an air-tight and water-tight seal along the interface between the rivet 101 shank 107 and the central bore 130 of retaining ring 109.

These air-tight and water-tight seals radially outward from the teeth on both the upper surface and lower surface of the fastener, and the inner seals along the shank protect the bonding location from corrosion or other deterioration induced by air or water or other fluids which might surround the bond.

FIGS. 15 to 24 show the the bonding fastener in a blind rivet embodiment. In this embodiment, the first component is a blind rivet 201 with a head 208 and a shank 207.

A blind rivet, often called a "Pop Rivet" (POP® is a registered trademark of Newfrey LLC, Newark, Del.), is a rivet 201 having a hollow shank 207. A mandrel 270 passes through the center bore 288 of the shank 207, having an enlarged head 271 in one end of the shank 207, and a free end 272 protruding from the head 208 of the rivet 201. The length of the mandrel 270 adjacent to the free end 272 can be provided with grooves 273 or some other roughening which allows a blind rivet tool to grasp the mandrel 270 at the free end 272 and pull the enlarged head 271 of the mandrel 270 into the hollow shank 207. This causes the hollow shank 207 to deform, so that the blind rivet 201 is pulled tight against a frame through which the rivet was passed. The fact that the rivet can thus be used from only one side of the frame (i.e. in a "blind hole") is the reason such rivets are called "blind" rivets.

The second component in this embodiment is a mating retaining ring 209 which has a central bore 230 which is sized large enough to allow the retaining ring 209 to slide upon shank 207 of the rivet 201, but small enough that when the mandrel 270 is pulled into the shank 207 by the rivet tool, the area 281 of the shank 207 which is deformed by the enlarged head 271 cannot pass through the central bore 230, and drawing the mandrel 270 further pushes the retaining ring 209. This will be seen and discussed below with respect to FIG. 24.

The facing lower surface 211 of the head 208 of rivet 201 and upper surface 235 of retaining ring 209 are formed with serrated bonding teeth 260 and 204, respectively. Teeth 260 protrude axially outward from the lower surface 211 of rivet 201, and teeth 204 protrude axially outward from the upper surface 235 of retaining ring 209. It will be understood that the terms "lower surface" and "upper surface" are not meant to convey any particular vertical or horizontal orientation, but rather are intended to mean the surface of the head of the rivet 201 or retaining ring 209 which will contact the surfaces of the parts which the bonding fastener is to bond.

The teeth 204 and 260 can be any shape or pattern of shapes which will pierce and or cut the surface of the adjacent material, for example the bent or serrated teeth shown in the figures, or cones, points, squares, a cut or punched pattern into the surface of the flange, or other designs known to the art.

The rivet 201 and retaining ring 209 can be made of any rigid metal or other conductive material, as is known for use in prior art fasteners. The particular metal used can depend on the nature of the metal surfaces to be bonded—it will be understood by one known to the art that it can be desirable to avoid contact between certain dissimilar metals due to the possibility of galvanic corrosion or RF noise effects. The metal can be coated or plated with a conductive coating or metal layer.

Outer seal 210 is located on the lower surface 211 of rivet 201, radially outside of the teeth 260. Similarly, outer seal 203 is located on the upper surface 235 of retaining ring 209, radially outside of the teeth 204. Seals 210 and 203 limit infiltration of air, water or other environmental contaminants radially inward from the environment into the bonding teeth. The outer seals 210 and 203 are made of resilient sealing material, such as synthetic or natural rubber, silicone, neoprene or other material known to the art which can withstand outdoor exposure and compressive forces.

The retaining ring 209 has inner seal 232 to limit infiltration of air, water or other environmental contaminants axially between the shank 207 of the rivet 201 and the central bore 230 of the retaining ring 209. This prevents these contaminants from entering from the environment into interior of the bond and corroding the bonding teeth. As shown in FIGS. 3-5 in the first embodiment, the inner seal 232 could be located centrally as shown in FIG. 19 or adjacent the upper or lower surfaces of the retaining ring 209.

As shown in FIGS. 15-18, the rivet 201 and retaining ring 209 can also have additional inner seals 266 and 236, located radially inward of the teeth 260 and 204, respectively. This optional seal, which can be an O-ring as shown, provides additional protection for the teeth 260 and 204 from water or other environmental contaminants from the inside of the bond.

As can be seen in the paired FIGS. 17-18, 20-21, and 22-23, the blind rivet 201 can be formed in two versions—with an open end 275, as in FIGS. 17, 20 and 22, or with a closed end 276 enclosing the enlarged head 271 of the mandrel 270, as in FIGS. 18, 21 and 23. In the open-end embodiments, a mandrel seal 277 can be provided in the center bore 288 of the shank 207, which can seal against the mandrel 270 and limit environmental leakage through the shank 207.

In this blind rivet embodiment, the fastener is tightened by putting the rivet tool (not shown) over the free end 272 of the mandrel 270, and pulling the enlarged end 271 of the mandrel 270 down into the shank 207.

Figure 24:
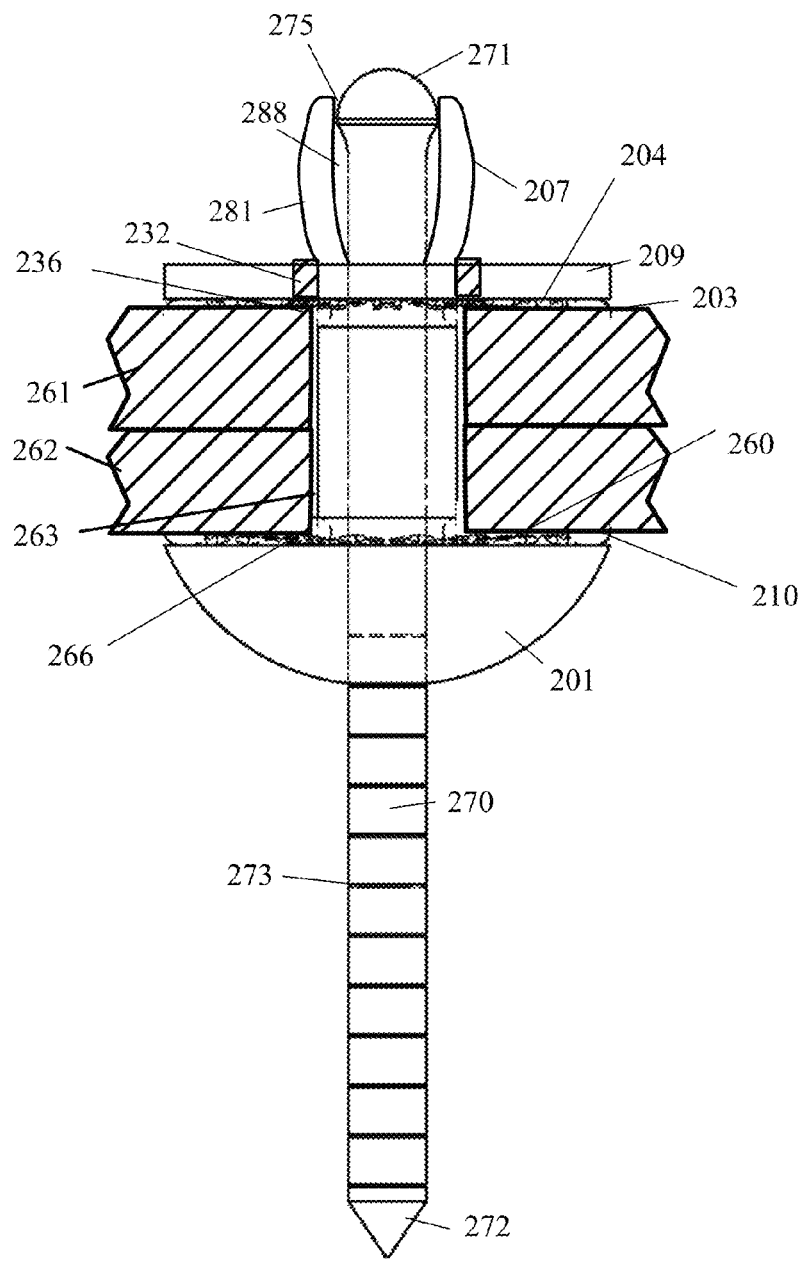
FIG. 24 shows a cut-through drawing of the embodiment of the fastener of FIG. 15, in use.

FIG. 24 shows the fastener in this blind-rivet embodiment in use to bond two frames 261 and 262 together. The shank 207 of blind rivet 201 is passed through a hole 263 in the two frames 261 and 262, and the central bore 230 of retaining ring 209 is placed over the shank 207 of the rivet 201 and slid downward to contact the upper surface of frame 261.

Next, a blind rivet tool (not shown) is placed over the free end 271 of the mandrel 270, and the tool is actuated to grasp the mandrel 270 at the free end 272 and pull the enlarged head 271 of the mandrel 270 into the hollow shank 207. This deforms the end 280 of the shank 207, pressing the retaining ring 209 downward on the shank 207 of the rivet 201, which tightens the fastener on the frames 261 and 262.

In the same way as explained with respect to the other rivet embodiment of FIGS. 10-14, above, the fastener is tightened, the teeth 260 of the rivet 201 and the teeth 204 of the retaining ring 209 embed into the outer surfaces of the frames 261 and 262 at the bonding location around the fastener, creating an electrical bond through the fastener. At the same time, the outer seal 210 of rivet 201 is compressed to create an air-tight and water-tight seal against frame 261 radially outside of the teeth 260, and outer seal 203 of retaining ring 209 is compressed to create an air-tight and water-tight seal against frame 262 radially outside of the teeth 204. Inner seal 232 on retaining ring 209 conforms to and seals the shank of the rivet 201, creating an air-tight and water-tight seal along the interface between the rivet 201 shank 207 and the central bore 230 of retaining ring 209.

It will be understood that while the terms "upper" and "lower", "outer" and "inner" are used in this explanation with respect to frames and surfaces for ease of discussion, no actual directionality is to be implied—the frames and fastener could be horizontal as shown, or vertical, or at any angle. Therefore, for the purposes of this explanation the "upper surface" of the first component, second component or frame and the "lower surface" of the first component, second component or frame are merely designations for the opposing faces, whether they are actually upper or lower, left or right, or whatever. On the first component, the "lower surface" means the surface in contact with the frame, and on the second component the "upper surface" is in contact with the frame. With respect to the frames "inner surface" is taken to mean the surface in contact with the other frame, and "outer surface" means the surface facing away from the other frame.

It will also be understood that while only one of the embodiments of the bonding device will be shown and described in this application as it might be used with the fastener of the invention, the other embodiments from the parent application are equally applicable and useful.

Although the term "frames" is used in this description, and flat plates are shown in the figures for simplicity, it will be understood that this term is intended to cover any conductive elements which need to be electrically bonded, including bonding mounts or straps to beams or surfaces of structures, and any other application. Similarly, the term "hole" is meant to encompass not just through-holes in flat frames as shown in the figures, but anything through which a fastener may pass, for example a threaded bore into a solid piece of metal, or the opening created by driving in a self-tapping screw or rivet.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An electrically conducting fastener comprising:
   a) a first component comprising a shank having two ends, with a head at one end, said head having an inner perimeter around the shank, an outer perimeter, and a facing surface with a plurality of teeth extending axially between the inner perimeter and outer perimeter; an inner resilient seal on the facing surface of the head, located radially inward of the teeth and an outer resilient seal on the facing of the body, located between the teeth and the outer perimeter of the head; and
   b) a second component comprising a metallic body, a central bore mating with the shank of the first component, and a surface having an inner perimeter around the central bore, an outer perimeter, and a plurality of teeth extending axially between the inner perimeter and outer perimeter; an outer resilient seal on the surface of the body, located between the teeth and the outer perimeter of the flange and a resilient thread seal in the inner perimeter for sealing around the shank of the first component.

2. The fastener of claim 1, further comprising a bonding device comprising:
   a metallic body having an upper surface, a lower surface, an inner perimeter surrounding a hole through which the threaded shank of the first component passes, an outer perimeter, and a plurality of teeth extending axially from the upper surface and the lower surface between the inner perimeter and the outer perimeter;
   an inner seal on the upper surface of the body, located radially inward of the teeth;
   an inner seal on the lower surface of the body, located radially inward of the teeth;
   an outer seal on the upper surface of the body, located between the teeth and the outer perimeter of the body; and
   an outer seal on the lower surface of the body, located between the teeth and the outer perimeter of the body.

3. The fastener of claim 1, in which the second component further comprises an inner seal on the surface of the body, located radially inward of the teeth.

4. The fastener of claim 1, in which the outer seal of the first component is an o-ring.

5. The fastener of claim 1, in which the outer seal of the second component is an o-ring.

6. The fastener of claim 1, in which the first component is a bolt, and the second component is a nut, the shank of the first component having a plurality of threads and the barrel of the second component being threaded to mate with the threads on the shank of the first component.

7. The fastener of claim 1, in which the fastener is a two-part rivet, the first component is the rivet and the second component is a retaining ring, in which a central bore of the retaining ring is a press-fit on the shank of the rivet.

8. The fastener of claim 1, in which the fastener is a blind rivet set, in which:
   the first component is the blind rivet, in which the shank is hollow, having a central bore;
   the second component is a retaining ring, in which a central bore of the retaining ring is a sliding fit on the shank of the blind rivet; and
   the first component further comprises a mandrel slideably received within the central bore of the shank, having an enlarged end adjacent the end of the shank which is opposite the head, a free end, and a length therebetween passing through the head of the blind rivet, such that when a rivet tool pulls on the free end of the mandrel, the enlarged end of the mandrel deforms the shank, thus tightening the fastener.

9. The fastener of claim 8, in which the end of the shank which is opposite the head is open, and the enlarged end of the mandrel is outside the blind rivet.

10. The fastener of claim 9, further comprising a shank seal inside the central bore of the hollow shank, sealing against the length of the mandrel.

11. The fastener of claim 8, in which the end of the shank which is opposite the head is closed, enclosing the enlarged end of the mandrel inside the shank of the blind rivet.

12. The fastener of claim 1, in which the second component further comprises an inner seal on the surface, radially inward from the teeth and radially outward from the inner perimeter.

13. The fastener of claim 1, in which the first component further comprises an inner seal on the surface, radially inward from the teeth and radially outward from the inner perimeter.

14. The fastener of claim 1, in which the first component further comprises a flange around the head.

15. The fastener of claim 1, in which the second component further comprises a flange around the body.

* * * * *